Feb. 6, 1962 M. ROGOFF 3,020,478
PHASE MEASURING DEVICE
Filed July 12, 1957
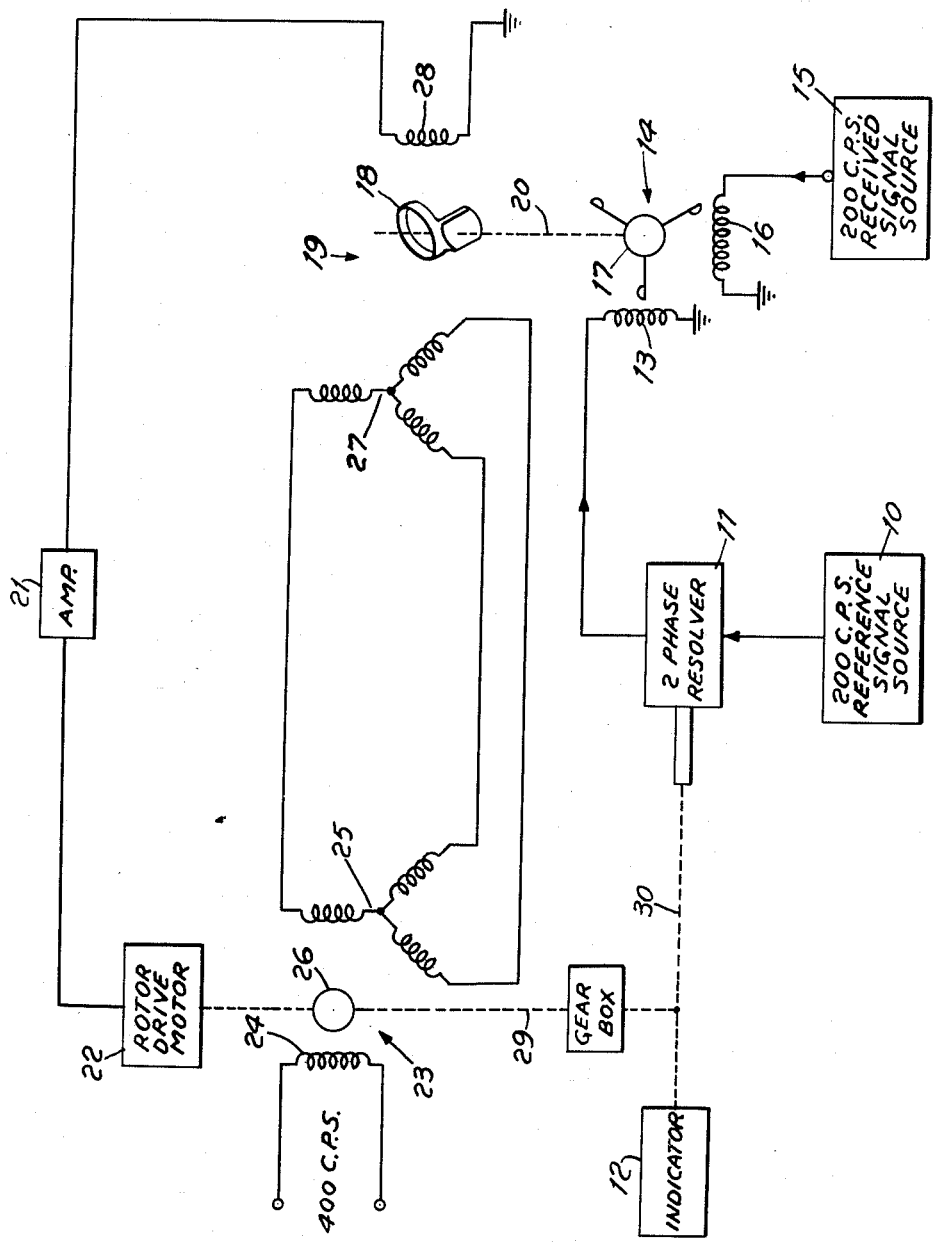
Inventor
MORTIMER ROGOFF
By [signature]
Attorney

United States Patent Office 3,020,478
Patented Feb. 6, 1962

3,020,478
PHASE MEASURING DEVICE
Mortimer Rogoff, Nutley, N.J., assignor to International Telephone and Telegraph Corporation, Nutley, N.J., a corporation of Maryland
Filed July 12, 1957, Ser. No. 671,434
6 Claims. (Cl. 324—83)

This invention relates to signal phase sensitive devices and in particular to a device for measuring the phase angle of an unknown signal.

There are known ways of measuring the phase angle of a signal. For instances, the control of the beam deflection means of a cathode ray oscilloscope by two signals of the same frequency will give rise to an oscilloscope pattern which is indicative of the phase angle between the signals. In the use of such a method, it is essential that any amplifiers in the circuit either introduce no phase change or introduce the same phase change to both controlling signals. Inasmuch as amplifiers are a necessary part of such a circuit, this presents a limitation of such use. Another limitation of such a system wherein tube circuitry is used occurs in connection with aircraft navigation systems such as Navaglobe. In such aircraft use the tube circuits do not lend themselves to long life reliable operation due to extreme vibrations associated with modern day aircraft operation.

It becomes manifest that a phase measuring or phase comparison system which is characterized by high sensitivity, negligible inherent phase distortion, and ruggedness when used with aircraft navigation systems would be desirable.

It is therefore an object of the present invention to provide an improved phase measuring device, and it is a further object to provide a sensitive phase measuring device whose capacity for introducing phase shift distortion is negligible. Still another object is to provide a rugged phase measuring device for use under conditions of extreme vibration.

In accordance with one feature of the present invention there is provided an extra sensitive control transformer synchro whose rotor is coupled to a drag cup motor rotor in turn whose quadrature windings are respectively coupled to a reference and an unknown signal, to effect an output signal from the sensitive control transformer synchro, which is indicative of the phase relationship of the signals appearing on the quadrature windings as interpreted by the amount of the movement of the rotor of the drag cup motor.

In accordance with another feature of the present invention there is provided a signal phase shifting means with an indicator, coupled in the path of the reference signal to shift the phase of the reference signal to seek coincidence with the phase of the unknown, and simultaneously indicate the amount of phase shift necessary to accomplish this phase angle coincidence.

Another feature of the present invention in conjunction with the first feature is the provision of a servo loop having a comparison means including said sensitive control transformer synchro and a signal generator synchro each of whose stator windings are coupled back to back, whereby said servo loop output effects a recognition of phase difference between the reference and unknown signals by causing the movement of the rotor of the generator to seek a null point when compared with the rotor position of the sensitive control transformer.

The foregoing and other objects and features of this invention and the manner of attaining them will become more apparent and the invention itself will be best understood by reference to the following description of an embodiment of the invention taken in conjunction with the accompanying drawing which is a block diagram of the system.

Referring specifically to the figure, there is a source 10 of reference signals passing reference signals to the two phase resolver 11. The resolver 11 can be of the type found in volume 21 of the MIT Radiation Laboratory Series, published by McGraw-Hill, 1948. With the indicator 12 setting at zero phase shift, the rotor and stator of the resolver 11 will be in such a position as to have no phase shifting effect on the signals passing therethrough. The signals from 11 pass to the quadrature winding 13 of the drag cut motor 14. A source 15 of unknown or received signals whose phase angle is to be measured or compared, passes signals to the other quadrature winding 16 of the drag cup motor 14. Unless the reference signal and the unknown signal are in phase the rotor 17 of the drag cup motor 14 will move. Assume that the signals are not in phase and therefore as mentioned above the rotor 17 will rotate which will cause the rotor 18 of the sensitive control transformer synchro 19 to turn by means of the coupling 20. The rotor 18 consists of a shaft with a coaxial ring positioned at an oblique angle thereto. The control transformer synchro 19 is coupled in series to the amplifier 21, the rotor drive motor 22 and the signal synchro generator 23 to form a servo loop. A servo reference signal received on the rotor winding 24 will set up a voltage vector relationship on the stator windings 25 depending on the position of the rotor 26, since the rotor winding 24 moves in accordance with the rotor 26. This voltage vector relationship appears on the stator windings 27 because of the back-to-back coupling. If the voltage summation, as experienced by the effect of the magnetic flux coupling at the stationary output winding 28, is something other than zero, then there will be an amplified difference signal passed to the motor 22 to move the rotor 26 to a new position. The rotor 26 will be continually moved as described above and continually set up new voltage vector relationships while seeking to establish a zero summation at 28. The rotor 18 is a rotor with a coaxial ring disposed in an oblique position to the shaft. This rotor can be of the type described in the U.S. Patent No. 2,689,951 issued to M. Argentieri et al., September 21, 1954. When this oblique positioned ring intersects the flux path between the stator windings 27 and output winding 28, there can be effected a very sensitive unbalance when compared with a device where the entire rotor winding is moved relative to the stator windings. Since under this hypothesis, the rotor 18 would be moving there would be a difference signal continually passed from 28 to 22 causing the rotor 26 to continually seek a null. As 26 moves, simultaneously, the rotor of the resolver 11 is moved by mechanical connections 29 and 30 and in accordance therewith the indicator 12 is moved. As the resolver rotor position is changed the reference signal is phase shifted to seek coincidence with the phase angle of the unknown signal. The indicator 12 by moving simultaneously with the resolver indicates the amount of phase shift of the reference signal at any time. When the phase angle coincidence has been attained, the indicator will indicate the total phase shift of the reference signal and hence the phase angle of the unknown signal when compared with the reference signal.

The invention as described thus far has dealt mainly with measuring or comparing the phase angle between two sinusoidal waveforms but this is not a limitation on the utility of the invention. It is known that the torque in a two-phase drag-cup motor which can be represented by $T \cong I_1 I_2 \sin \phi$ where $I_1$ and $I_2$ are current signals having the same frequency and $\phi$ is the phase angle between the signals. The torque resulting from applying $I_1$ and $I_2$ to a two-phase drag-cup motor is a steady or constant torque having no variations according to variations in the waveform of the signals but will only vary, respectively, more or less as the phase angle difference between the two signals approaches 90° or zero°. This two-phase motor torque, assuming no outside starting equipment, is a resultant phenomenon only if the two signals have the same frequency and this concept renders the present invention useful as a complex waveform analyzer. For instance, if there is a signal represented by $I_1 = I \sin \omega T$, and another signal represented by $I_2 = \ldots + I \sin (\omega T + \theta) + \ldots$ terms of a Fourier series, the present invention would determine the presence of the term "$I \sin (\omega T + \theta)$." It is clear that the use of the invention in this role makes it possible to determine the presence of a particular signal present in a signal with a complex waveform. Another use of the present invention predicated on this point of discussion is that of determining the phase relationship between two signals wherein one of the signals is in the form of a square wave and the other signal is in the form of a sine wave. Very often, in dealing with high frequency signals, the high frequency signals are handled by means of a multivibrator whose output is a square wave. As described above the present invention will recognize the basic sine wave (or frequency) contained within the square wave and compare it to the reference signal.

While I have described above the principles of my invention in connection with specific apparatus, it is to be clearly understood that this description is made only by way of example and not as a limitation to the scope of my invention as set forth in the objects thereof and in the accompanying claims.

I claim:

1. A phase sensitive device for determining the phase angle of a signal comprising a two-phase drag cup motor having a rotor and quadrature windings, an alternating current servo loop having a flux path and including a phase shifting comparison means, a source of alternating current reference input signals coupled to said phase shifting comparison means to pass reference alternating current signals thereto, said servo loop having its output coupled to one of said quadrature windings, a source of unknown signals whose phase is to be determined coupled to the other quadrature winding, said two-phase motor rotor moving in accordance with the phase angle relationship between the signals appearing on said quadrature windings, a coupling means intersecting the flux path of the servo loop and coupling said servo loop to said two-phase motor rotor to effect a phase angle comparison between the signals on said two quadrature windings to alter the phase angle of the servo loop output in accordance therewith, and indicating means coupled to said phase shifting comparison means to indicate the amount of phase angle shift necessary to have said servo loop experience a null for said phase angle comparison which will determine the phase angle of said unknown signal, said coupling comprising a coaxial ring positioned at an oblique angle to said rotor.

2. A phase sensitive device for determining the phase angle of a signal comprising a two-phase drag cup motor having a rotor and quadrature windings, phase angle shifting means whose output is coupled to one of said quadrature windings, a source of alternating current reference input signals coupled to said phase shifting means to pass a reference signal thereto, a source of unknown signals whose phase is to be determined coupled to said other quadrature winding, said two phase motor rotor moving in accordance with the phase angle relationship between the signals appearing on said quadrature windings, an alternating current servo loop having a flux path and including a comparison means whose output is coupled to said phase angle shifting means to alter the phase angle of said reference signal passing therethrough, said comparison means including a rotatable coupling in the flux path of said servo loop and coupled to said two-phase motor rotor to effect in conjunction with said servo loop a phase angle comparison between the signals on said two quadrature windings with a resulting servo loop output in accordance therewith, and indicating means coupled to said phase shifting means to indicate the amount of phase angle shift necessary for said servo loop to experience a null for said phase angle comparison which will determine the phase angle of said unknown signal, said coupling comprising a coaxial ring positioned at an angle to said rotor.

3. A phase sensitive device according to claim 2, wherein said comparison means includes a synchro generator whose rotor is coupled to said phase shifting means and a synchro control transformer whose rotor is coupled to said two phase motor rotor.

4. A phase sensitive device according to claim 2, wherein said phase shifting means of a two phase resolver coupled to said source of reference signals.

5. A phase sensitive device according to claim 3, wherein said synchro control transformer includes a set of stator windings, a stationary output winding and a rotor, and said rotatable coupling means comprising a rotor shaft, a coaxial ring thereon disposed at an oblique angle thereto and an alternating current source of servo reference signals coupled to said transformer.

6. A sensitive phase measuring device for measuring the phase angle of an unknown alternating current signal comprising a drag cup motor having a rotor and quadrature windings, a phase angle resolver whose output is coupled to one of said quadrature windings, a source of reference input alternating current signals coupled to said phase resolver to pass a reference signal thereto, a source of unknown signals whose phase is to be determined coupled to said other quadrature winding, said drag cup motor rotor moving in accordance with the phase angle relationship between the alternating current signals appearing on said quadrature windings, a sensitive control transformer synchro having a set of stator windings, a stationary output winding and a rotor, said rotor shaft having a coaxial ring thereon disposed at an oblique angle thereto, coupled to the rotor of said drag cup motor, a synchro generator device having stator windings, rotor windings and a rotor, said generator stator windings coupled to said control transformer stator windings back to back, amplifier means, rotor driving means coupled to the rotor of said synchro generator and circuitry coupled through said amplifier to said output winding of said control transformer to form an alternating current servo loop, a source of rotor position reference signals coupled to the rotor windings, means coupling the rotor of said synchro generator to said phase shifting means to shift the phase of said reference signal in accordance with said generator rotor positions and indicating means coupled to said phase shifting means to indicate the amount of phase shift of said reference signal necessary to cause said servo loop to reach a null position.

References Cited in the file of this patent

UNITED STATES PATENTS

| | | |
|---|---|---|
| 2,390,463 | Roters | Dec. 4, 1945 |
| 2,462,916 | Spindler | Mar. 1, 1949 |
| 2,479,817 | Curran | Aug. 23, 1949 |
| 2,494,493 | Schaevitz | Jan. 10, 1950 |
| 2,532,890 | Castle | Dec. 5, 1950 |
| 2,553,558 | Earp | May 22, 1951 |
| 2,561,319 | Runyan | July 17, 1951 |
| 2,706,274 | Boyer | Apr. 12, 1955 |
| 2,748,355 | Jarvis | May 29, 1956 |
| 2,769,969 | Comstock | Nov. 6, 1956 |
| 2,800,655 | Parzen | July 23, 1957 |
| 2,857,564 | Gray | Oct. 21, 1958 |